O. H. AND A. F. PIEPER.
ELECTRIC MOTOR.
APPLICATION FILED NOV. 12, 1917.

1,348,239.

Patented Aug. 3, 1920.

WITNESSES:
Walter B. Payne
George D. Powell

INVENTORS
Oscar H. Pieper
BY Alphonse F. Pieper
Their ATTORNEYS.

UNITED STATES PATENT OFFICE.

OSCAR H. PIEPER AND ALPHONSE F. PIEPER, OF ROCHESTER, NEW YORK.

ELECTRIC MOTOR.

1,348,239.  Specification of Letters Patent.  Patented Aug. 3, 1920.

Original application filed May 27, 1912, Serial No. 699,938. Divided and this application filed November 12, 1917. Serial No. 201,546.

*To all whom it may concern:*

Be it known that we, OSCAR H. PIEPER and ALPHONSE F. PIEPER, of Rochester, in the county of Monroe and State of New York, have invented certain new and useful Improvements in Electric Motors; and we do hereby declare the following to be a full, clear, and exact description of the same, reference being had to the accompanying drawings, forming a part of this specification, and to the reference-numerals marked thereon.

The invention has for its object to afford a cover for electric motors which will be free from noise and also dust-proof, so as to entirely protect the motor and motor casing within. The invention is especially applicable to small motor construction such as used generally in dental surgery, and an equally important purpose is to provide a construction which can be economically manufactured and is otherwise adapted practically to accomplishing the functions before stated. To these and other ends the invention resides in certain improvements and combinations of parts all as will be hereinafter more fully described, the novel features being pointed out in the claims at the end of the specification.

In the drawings.

Similar reference numerals throughout the several views indicate the same parts.

Figure 1:
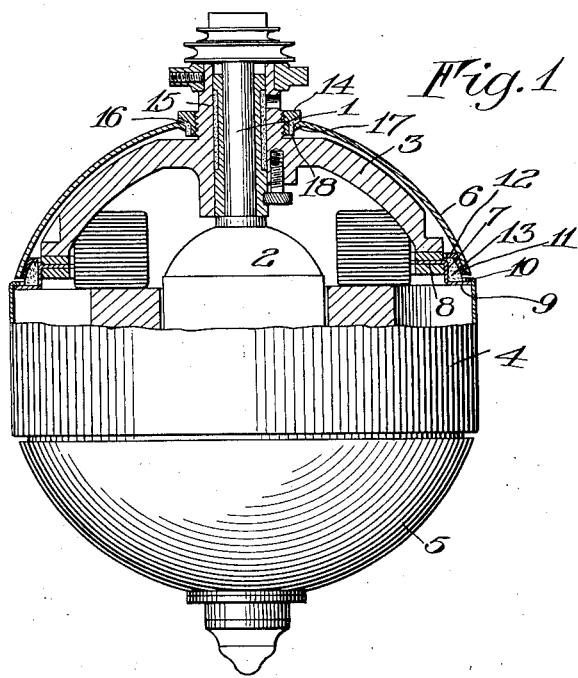
Figure 1 is a side elevation partly in section showing an electric motor equipped with the invention.
Figure 2:
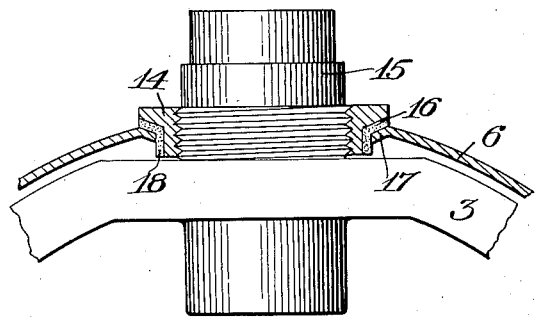
Fig. 2 is an enlarged sectional view in detail of the joint at the upper portion of the cover section appearing in Fig. 1.
Figure 3:
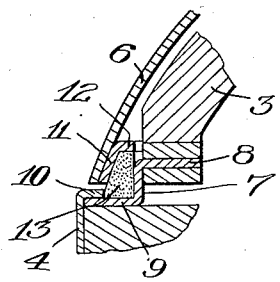
Fig. 3 is an enlarged sectional view of the joint at the lower portion of the cover section.

This application is a division of an original application filed by us May 27, 1912, Serial No. 699,938. The structure here shown comprises a motor shaft 1, armature 2 and motor casing or frame 3 upon which the field is supported, as usual in structures of this character. The cover which surrounds the motor casing is preferably formed of a fixed central section 4, and removable end sections 5 and 6 which are held in place in the following manner. 7 designate annular supporting members which are fixedly attached to the casing 3 through the instrumentality of inwardly projecting flanges 8 and are provided with outwardly projecting flanges 9 to which the central section 4 is attached, the latter being provided with inwardly projecting flanges 10 which are spun over the flanges 9. The end sections 5 and 6 are both attached in a similar manner and for the present purpose it will suffice to describe only one of these.

The cover section 6 has fixed thereon at its inner edge an annular plate 11 provided with an inwardly projecting flange 12. The inner surfaces of the plate 11 and flange 12 engage a body or ring of resilient material such, for example, as felt, designated by 13 and resting upon the flange 9. This resilient packing coöperates with the flange 12 to form a completely noiseless and dust-proof joint. To accomplish this, the section 6 must be forced toward the resilient packing element 13, and this is effected by means of a threaded retaining ring or nut 14 which engages the reduced end or bearing of the casing 15 and is adjustable thereon in order to exert a pressure against the cover section 6. A noiseness and dustproof joint is also provided between the outer portion of the cover section and the retaining ring 14, which is obtained by providing an inclined surface 16 upon the nut, arranged to oppose a correspondingly inclined flange 17 on the cover section 6, the flange 17 being formed by bending the outer edge of the section slightly in an inward direction. Disposed between the flange 17 and the nut 14 is a packing ring 18 of resilient material, which permits a tight pressure against the section 6 and at the same time prevents direct contact between it and the nut 14. By adjusting the retaining ring 14, the cover section 6 can be adjusted with any desired degree of pressure against the packing ring 13, and is thus held rigidly in position. Dust or dirt is entirely excluded from the motor casing and all noise which might otherwise result from a loosely held cover with relatively moving contacting metallic portions, is obviated.

We claim as our invention:

1. The combination with an electric motor casing, of an annular supporting flange fixed to the casing, a ring of resilient material arranged on said supporting flange, a cover section carrying an inwardly projecting flange which rests on said ring of resilient material, and a retaining ring threaded on the casing for holding the cover in position and clamping said ring of resilient material between said flanges.

2. The combination with an electric motor casing, of a circular supporting flange fixed on the casing, a ring of resilient material arranged on said supporting flange, a cover section carrying an inwardly projecting flange which rests on said ring of resilient material, a retaining ring threaded on the casing for holding the cover section in position, an integral inwardly bent flange formed on the section adjacent to said retaining ring, and resilient material interposed between said last mentioned flange and the retaining ring.

3. The combination with an electric motor casing, a central cover section fixed to said casing, a supporting flange secured to said casing and engaging said central section, a second cover section, a ring having an inwardly projecting flange secured in said second cover section, and a packing ring clamped between said flanges.

OSCAR H. PIEPER.
ALPHONSE F. PIEPER.